United States Patent
Rotman et al.

(10) Patent No.: US 6,865,448 B1
(45) Date of Patent: Mar. 8, 2005

(54) CONSTRUCTION KIT AND METHOD FOR CONSTRUCTING SEVERAL COMPLEX INDUSTRIAL INSTALLATIONS

(75) Inventors: Frédéric Rotman, Paris (FR); Antoine Willemot, Gif-sur-Yvette (FR); Lionel Barry, Charenton le Pont (FR); Laurent Ferenczi, Parmain (FR)

(73) Assignee: L'Air Liquide - Societe Anonyme a Directoire et Conseil de Surveillance pour l'Etude et l'Exploitation des Procedes Georges Claude, Paris Cedex (FR)

( * ) Notice: Subject to any disclaimer, the term of this patent is extended or adjusted under 35 U.S.C. 154(b) by 0 days.

(21) Appl. No.: 09/743,200

(22) PCT Filed: Apr. 19, 2000

(86) PCT No.: PCT/FR00/01016

§ 371 (c)(1),
(2), (4) Date: Jan. 8, 2001

(87) PCT Pub. No.: WO00/70418

PCT Pub. Date: Nov. 23, 2000

(30) Foreign Application Priority Data

May 12, 1999 (FR) .......................................... 99 06089

(51) Int. Cl.[7] .............................................. G05D 9/00
(52) U.S. Cl. ......................... 700/275; 700/281; 700/282
(58) Field of Search ................................... 700/275, 281, 700/282; 73/863.01, 863.31

(56) References Cited

U.S. PATENT DOCUMENTS 6,167,766 B1 * 1/2001 Dunn et al. .............. 73/863.01

* cited by examiner

*Primary Examiner*—Leo Picard
*Assistant Examiner*—Charlie Kasenge
(74) *Attorney, Agent, or Firm*—Young & Thompson

(57) ABSTRACT

An outfit for the construction of several complex industrial installations for the treatment of industrial fluids includes several assemblies of several functional modules, each adapted to perform an elementary operation. Each functional module includes at least one input and at least one output, as well as a local guide unit of the functional module provided with a communication interface. All the functional modules have the same assembly to carry out the same elementary operation and are standard. The functional modules are adapted to be associated functionally with each other in installations. The outfit moreover includes, for each industrial installation, a single central guide unit, adapted to guide the functional modules of the associated industrial installation.

20 Claims, 2 Drawing Sheets

US 6,865,448 B1

CONSTRUCTION KIT AND METHOD FOR CONSTRUCTING SEVERAL COMPLEX INDUSTRIAL INSTALLATIONS

BACKGROUND OF THE INVENTION

The present invention relates to an outfit for the construction of several complex industrial installations for the processing of fluids.

DESCRIPTION OF THE RELATED ARTS

At numerous industrial production sites, there are provided local production means for gases having predetermined compositions and pressures.

Thus, production equipment, constituting together a complex industrial installation, installed on site to process gases, generally from air, and to send the latter to the user installation.

When the user installation requires the supply of the several separate fluids, the production installation provided upstream is relatively complex, so as to satisfy the needs. In the case of such demand, two types of installation are at present proposed.

In a first solution, various equipment each adapted for the production of a fluid, are juxtaposed so as to supply the fluids necessary to the user installation. Thus, for example, an air compressor unit, an impure nitrogen generator and a pure nitrogen generator are disposed side by side.

This solution has the drawback of uselessly duplicating certain functions that are performed redundantly in various pieces of equipment. For example, the function of compression or drying of air is needed not only in the air compression unit but also in the nitrogen generators.

This duplication of functions gives rise to unnecessary cost of construction and operation. Moreover, in such installations, the piece of equipment adapted for the production of each of the gases is often over-dimensioned so as to be able to respond at any time to a variable demand.

A second solution consists in using an "as needed" installation developed specifically to respond optimally to the needs of the user installation.

This solution leads to an optimization of the production unit installation. However, it involves high design cost and renders difficult its industrial use, because of the uniqueness of the installation. Moreover, subsequent changes of such an installation are difficult to manage if the requirements of the consuming installation change. Finally, such an installation is difficult to be used in another context.

SUMMARY OF THE INVENTION

The invention has for its object to provide means for the creation of complex industrial installations permitting, with minimum investment, creating a wide range of industrial installations.

To this end, the invention has for its object an outfit for the construction of several complex industrial installations for the treatment of fluids, characterized in that it comprises:

several assemblies, the functional modules being adapted each to carry out an elementary operation on at least one fluid of an industrial installation, in which:

each functional module comprises at least one input and at least one output for the passage of a fluid, as well as a local management unit of the functional module controlling the operation of the functional module for carrying out the associated elementary operation, the local management unit comprising a communication interface, all the functional modules of a same assembly are adapted to carry out the same elementary operation on a fluid, and are of standard construction, such that the specific characteristics of the inputs, the outputs and the communication interfaces of all the functional modules of a same assembly are analogous, and the functional modules are adapted to be associated functionally with each other by their inputs and outputs in the industrial installations, so as to ensure successive elementary operations on the fluid, which output comprises moreover, for each industrial installation, a unique central guide unit, adapted to guide the associated industrial installation, by addressing guide orders to the local management units of the standard functional modules of the industrial installation, via communication interfaces connected to the central guide unit by a communication network.

According to particular embodiments, the construction outfit comprises one or several of the following characteristics:

the local management unit of each standard functional module is adapted to address information messages to the central guidance unit of the installation, which information messages are representative of the state of operation of the functional module, or the state of the fluid on which the functional module acts;

the central guidance unit of each installation comprises means for correcting the requirements of the user equipment connected to the output of the installation, through a data transfer network;

it comprises an assembly of standard supply modules adapted to ensure the supply of energy to a portion of the functional modules of each installation under the control of the guidance unit of the installation;

it comprises an assembly of standard control modules adapted to record information on the fluid circulation in an installation and to transmit this information to the central guidance unit of said installation; and it comprises an assembly of standard electrical energy generation modules adapted to ensure the production of electricity from energy supplied by other standard modules of the installation.

The invention also has for its object a process for the construction of several complex industrial installations for the processing of fluids, characterized in that it comprises the steps consisting in:

A) producing assemblies, the functional modules being adapted each to carry out an elementary operation of an industrial installation, in which:

each functional module comprises at least one input and at least one output for the passage of a fluid, as well as a local management unit of the functional module controlling the operation of the functional module for performing the associated elementary operation, the local management unit comprising a communication interface, and all functional modules of a same assembly are adapted to carry out the same elementary operation on a fluid, and are of standard construction, such that the details of the inputs, the outputs and the communication interfaces of all the functional modules of a same assembly are analogous;

B) producing for each industrial installation, a central guidance unit adapted to guide the associated industrial installation, by addressing the guidance orders to the local management units of each standard functional module of the installation, via communication interfaces connected to the central guidance unit by a communication network;

C) functionally associated, in its industrial installation, the functional modules with each other by their inputs and outputs, so as to ensure successive elementary operations on the fluid of each complex industrial installation; and D) installing in each industrial installation a central guidance unit connected to the communication interfaces of all the standard functional modules of the installation by a communication network.

BRIEF DESCRIPTION OF THE DRAWINGS

The invention will be better understood from a reading of the description which follows, given solely by way of example, with respect to the drawings, in which.

DESCRIPTION OF THE PREFERRED EMBODIMENT

Figure 1:
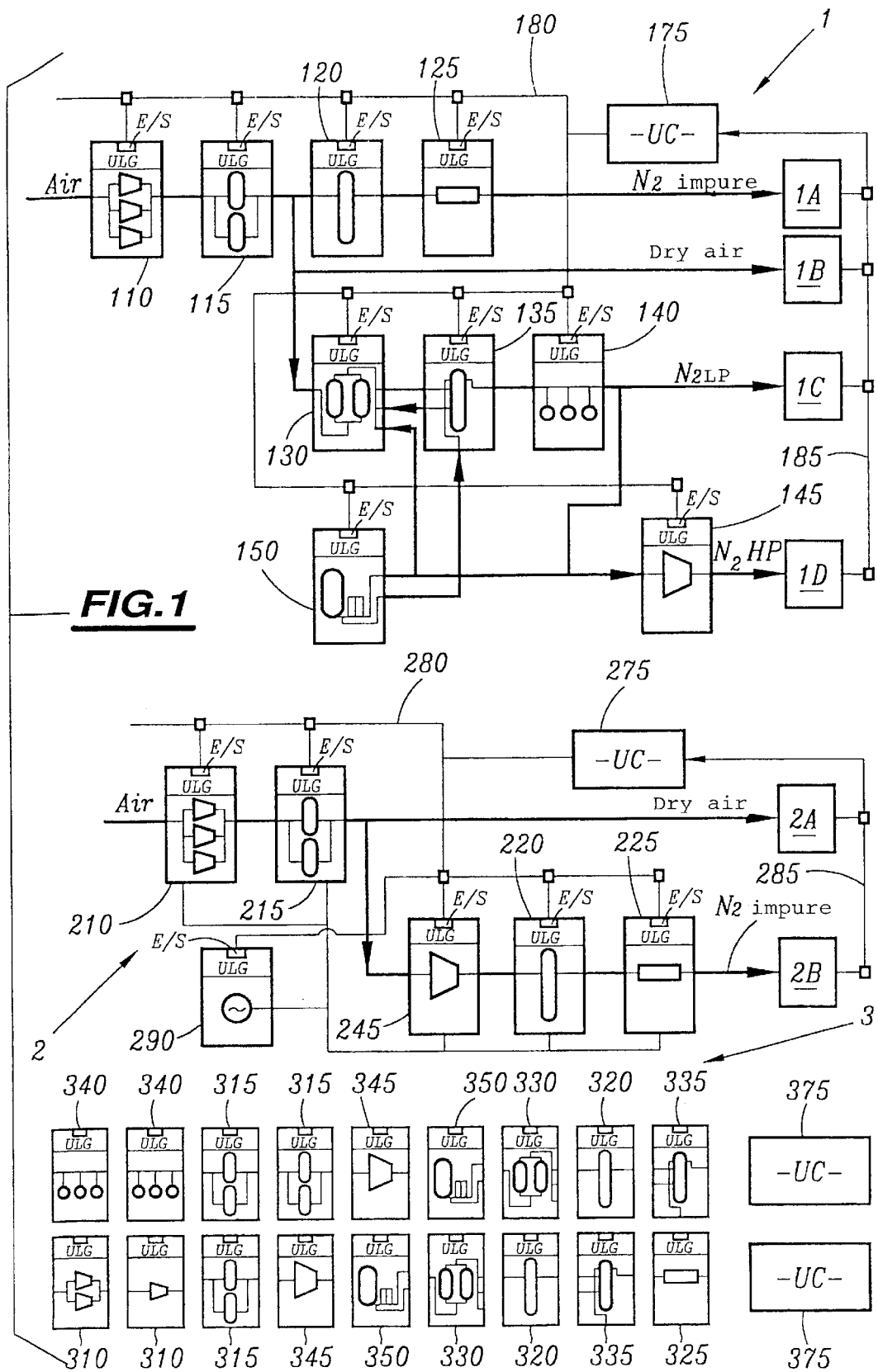
FIG. 1 is a schematic view of an example of a construction outfit according to the invention, whose functional modules are used in two industrial installations or disposed in a stock.

The construction outfit shown in FIG. 1 comprises a plurality of standard functional modules arranged as a function of their type in several assemblies. The functional modules of a same assembly are all adapted to carry out the same operation or elementary step leading to an important transformation of a fluid.

The expression elementary operation designates a transformation of a given type which can be carried out on a fluid, such as for example modification of its temperature, its pressure, its composition and/or all other variables of condition.

In practice, a transformation of the fluid is carried out by application of an important function with which can be associated one or several connected functions adapted to promote the carrying out of the principal function.

For example, the principal function of a compression module is to increase the pressure of a gas, for example by the action of a screw. An associated function in this case is the cooling of the resulting gas. Another associated function is for example the filtration carried out downstream of the compressor screw and which takes impurities out of the gas.

Figure 2:
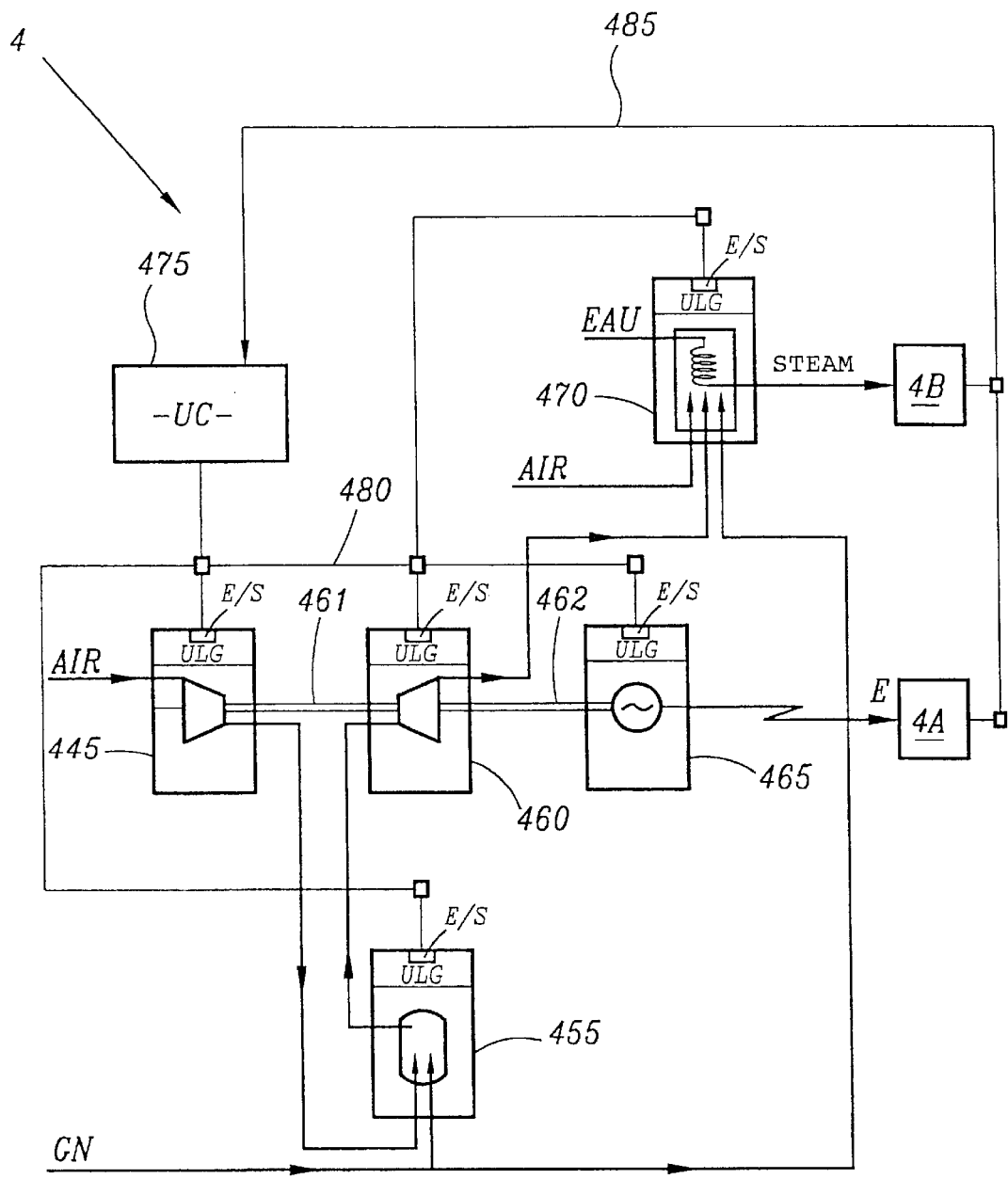
FIG. 2 is a schematic view of another industrial installation that can be produced with the help of the outfit according to the invention.

The functional modules of the construction outfit shown in FIG. 1 are arranged in two installations for the production of gas, indicated at 1, 2 and in a stock of functional modules indicated by the overall reference numeral 3. FIG. 2 shows another installation 4 made from the outfit according to the invention.

In the drawings, the standard functional modules of a same assembly of functional modules are designated by three-digit reference numerals, whose two last digits are identical and representative of the assembly to which they belong and whose first digit is equal to 1, 2 or 4 according to whether it is the installation 1, 2 or 4 into which they are incorporated, or is equal to the digit 3 if the functional modules are in the stock 3.

The installation 1 is adapted to produce, from atmospheric air, impure nitrogen, dry air, low pressure nitrogen and high pressure nitrogen. These gases are sent to pieces of consumer equipments designated 1A, 1B, 1C and 1D, respectively.

The installation of FIG. 1 comprises, at its inlet, a standard compression module 110. This comprises three compressors mounted in parallel.

As all functional modules of the outfit according to the invention, the module 110 comprises a local management unit, designated ULG. This is adapted to control the operation of the functional module to practice the associated elementary operation. In the present case, the local management unit ULG is adapted to manage locally the operation of the three compressors mounted in parallel.

The local management units ULG of all the functional modules of the outfit according to the invention comprise a communication interface, designated E/S, adapted to transmit data from and to the corresponding functional module.

Preferably, the local management unit ULG is constituted by a PC type computer or a programmable robot using a suitable program.

At the output of the compression module is disposed a drying module 115 comprising two adsorption cylinders mounted in parallel.

The output of the drying module 115 directly supplies the consuming equipment 1B with dry air.

On a branch supplying the consumer equipment 1A with impure nitrogen are arranged in series an air treatment module 120 and a permeation module 125.

The air treatment module 120 comprises filters, whilst the permeation module 125 comprises one or several membranes selectively permeable by nitrogen and oxygen.

The output of the drying module 115 is connected by means of a second branch conduit, to several other functional modules supplying the consumer equipment 1C and 1D with low-pressure nitrogen and high-pressure nitrogen.

In this branch is disposed first of all a drying decarbonating module 130. This comprises two adsorption cylinders mounted in parallel.

At the output of the drying decarbonation module is provided a distillation module 135 and a control module 140. The distillation module 135 comprises a distillation column, whilst the control module 140 comprises an assembly of pressure detectors.

The output of the control module 140 is connected to the consumer equipment 1C and supplies the latter with low-pressure nitrogen.

The output of the control module 140 is also connected to a supercharging module 145 comprising a supercharger. The supercharging module 145 supplies the consumer equipment 1D with high-pressure nitrogen.

Moreover, the installation comprises a storage module 150 connected to the input of the designation-decarbonation module 130 for the supply of this latter. Outputs of the storage module 150 are also connected, on the one hand, to the distillation module 135, and on the other hand, to the supercharging module 145.

As indicated above, all the functional modules of the outfit of the invention each comprise a local management unit ULG ensuring the management of the associated function of the associated functional module.

In each installation, made from the outfit according to the invention, different functional modules are connected to a certain central guidance unit 175 suitable for the installation, by means of a communication network 180. This network is for example of the ETHERNET, FIP, PROFIBUS or MODBUS type. Each functional module, connected to the network 180 by its communication interface E/S can also, on the one hand, receive control orders from the central guidance unit 175 and, on the other hand, send to these latter information messages relating to its functional condition.

The functioning of a given functional module is locally managed by the local management unit as a function only of the control orders received from the central guidance unit.

Moreover, each consumer equipment 1A, 1B, 1C, 1D is connected to the central guidance unit 175 by a data transfer network 185 so as to communicate to the latter its requirements concerning the resource supplied by the installation.

The central guidance unit 175 performs the "symphony conductor" function by controlling the operation of each functional module of the installation as a function of the needs of the consumer equipment and taking account of the information communicated by the functional modules, this information relating particularly to their availability.

The control orders addressed by the central guidance unit comprise essentially values of standards to be achieved at the output of the functional modules. These can be for example a flow rate of air for a compression module, a degree of moisture for a drying module, or else a minimum composition of a given constituent for a permeation or distillation module.

The information messages emitted by each functional module toward the central guidance unit comprise essentially data relative to the condition of the fluid on which the functional module operates and the data relating to the condition or needs of the functional module.

The data relative to the condition of the fluid can be broken down into particular variables, such as the temperature, the pressure or the composition of the fluid and into overall variables such as the volume or the mass of the fluid treated.

The data relative to the condition or to the needs of the functional module pertain particularly to the actual condition of operation of the module and to its future capabilities to perform the operation for which it is provided. Moreover, these data relate also to the needs as to resources, particularly the available energy, needed for the correct operation of the functional module.

According to the invention, the standard functional modules of a same assembly are of standard construction, such that the standards for the inputs, the outputs and the communication interfaces E/S are analogous.

Thus, the functional modules of a same assembly are all adapted to carry out the same operation or elementary step on a fluid so as to produce a change of condition of this fluid.

The modules are thus all interchangeable among themselves because of the analogy of their inlet and outlet. Moreover, they are adapted to receive control orders from any central guidance unit of an installation from their local control unit ULG.

The analogy between the inlets and outlets of the different functional modules of the same assembly is rendered more valuable by their functional similarities, namely to admit or evacuate a fluid of a given nature under predetermined conditions. However, the diameter of the inlets and outlets, or else of the connections which are there provided, can be different, adaptors being then necessary during replacement of a given functional module by another functional module of the same assembly.

The installation 2 shown in FIG. 1 is made from the construction outfit according to the invention. It is adapted, from atmospheric air, to supply dry air to a consumer equipment 2A and impure nitrogen to a consumer equipment 2B.

According to the invention, installation 2 is made from standard functional modules and a central guidance unit from the construction outfit.

The installation 2 comprises, at its input, a compression module 210 mounted in series with a drying module 215. The output of the drying module 215 is connected directly to consumer equipment 2A to supply it with dry air.

Moreover, a branch ensures the supply of a portion of the dry air obtained at the outlet of the drying module 215, to a supercharging module 245. At the output of this latter are arranged successively an air processing module 220 and a permeation module 225. The output of this latter is connected to the consumer equipment 2B for its supply with impure nitrogen.

Each of the functional modules of the installation 2 is connected to a central guidance unit 275 via a communication network 280. This connection is effected by means of communication interfaces E/S of each functional module.

The consumer equipment 2A and 2B is connected to the central guidance unit 275 by a data transfer network 285 permitting the consumer equipment to transmit its needs to the central guidance unit.

Moreover, a supply unit 290 is provided for supplying electrical energy to each of the functional modules of the installation 2. This supply module 290 comprises for example an electrical generating group. It is provided with a local management unit ULG adapted to ensure the guidance of the electrical generating group. The local management unit ULG comprises a communication interface E/S connected to the network 280. Thus, the supply modules receives control orders from the central guidance unit 275 to set its level of production as a function of the needs of the functional modules that are supplied.

The stock 3 contains different functional modules of each assembly. The functional modules are designated as above by a reference numeral whose first digit is 3 and whose two second digits designate the assembly to which the functional modules belong.

Thus, the stock 3 comprises two standard compression modules 310. These compression modules comprise, as to one of them, two compressors, and as to the other, one compressor.

Similarly, the stock 3 comprises three drying modules 315, two air processing modules 320, a permeation module 325, two drying-decarbonation modules 330, two distillation modules 335, two control modules 340, two supercharging modules 345 and two storage modules 350.

Moreover, the stock comprises two central guidance units 375.

In FIG. 2 is shown an installation for the co-generation of steam and electricity, made from a construction outfit according to the invention.

Thus, the functional modules used in this installation are standard and each is adapted to perform one elementary operation. The functional modules are controlled by a central guidance unit.

The installation shown in FIG. 2 is adapted to produce both electrical energy and steam from atmospheric air and natural gas. The electrical energy is supplied to a consumer equipment 4A and the steam is supplied to a consumer equipment 4B.

The installation 4 comprises a combustion module 455 comprising a combustion chamber whose operation is managed by the local management unit ULG belonging to the functional module.

The combustion module 455 comprises an inlet for introduction of natural gas and an inlet for introduction of combustion gas comprised by compressed air. These inlets supply the burner to establish a flame.

The installation comprises a compression module 445, receiving at its input atmospheric air, and whose output supplies the combustion module 455 with compressed air.

The output of the combustion module 455 is connected to an expansion module 460 comprising a gas turbine. The gas turbine of the expansion module 460 is connected mechanically by means of a shaft 461 to the compressor of the compression module 455, to drive the latter.

Moreover, the turbine or expansion module 460 is mechanically connected to a module for the production of electrical energy 465 by a shaft 462. The module for the production of electrical energy 465 comprises an alternating driven by the shaft 462.

Thus, under the action of combustion gases from the combustion module 450, the turbine of the expansion module 460 drives the compressor of the compression module 445 and the alternator of the module for the production of electrical energy 465.

The outlet of the expansion module 460 is connected to an input of a steam production module 470. This latter comprises a coil disposed in a burner. The coil receives at its inlet water and produces at its outlet steam. For the vaporization of the water, under the action of the heat of a flame, the burner receives at its input natural gas, air and combustion residues from the combustion module 455, after they have passed through the expansion module 460.

As in all installations made from the outfit according to the invention, the installation 4 comprises a central guidance unit 475 connected by a network 480 to the communication interfaces E/S of the local management units of each of the functional modules.

The user equipment 4A and 4B is connected to the central guidance unit 475 by a network 480 to indicate to the latter the needs for the resources produced at the output of the modules 465 and 470 respectively.

As in all installations made from the outfit according to the invention, the installation is managed by the central guidance unit 475, which sends to each of the functional modules control orders and receives from these latter information messages.

The standardization of the inlets, the outlets and the communication interfaces permits reduction of the overall cost of production and use of several installations for treating fluid, whilst satisfying the needs of the consumer equipment disposed downstream.

The presence in each functional module of a local management unit ensuring the management of the operation of the module from control orders received by the central guidance unit, permits a simple and rapid arrangement of the installation, only the central guidance unit having to be configured and programmed to respond to the needs of the user equipment.

The installations described here are adapted for the processing essentially of gases. However, the outfit according to the invention could comprise functional modules permitting the treatment of liquids or of pulverulent materials.

Moreover, the installation described here permits the management of the malfunctions of the functional modules, thanks to the return of the conditions of these latter to the central guidance unit.

A construction outfit as described here is particularly useful for the treatment of gases, particularly the separation of gases from air.

What is claimed is:

1. Outfit for the construction of several industrial installations for the processing of industrial fluids, to be delivered to users, comprising:

several assemblies of several functional modules the functional modules being adapted each to perform an elementary physical operation on at least one said industrial fluid, wherein, each functional module comprises at least one fluid inlet and at least one fluid outlet for the passage of said industrial fluid, as well as a local management unit controlling the operation of the functional module to perform the associated elementary operation, the local management unit comprising a communication interface, all the functional modules of a same assembly are adapted to perform the same elementary operation on said industrial fluid, and are of standard construction, such that the specifications for the inlets, the outlets and the communication interfaces of all the functional modules of a same assembly are analogous, and the functional modules are adapted to be associated functionally with each other by their inlets and outlets in industrial installations, so as to ensure successive elementary operations on said industrial fluid, said outfit moreover comprises, for each industrial installation, a single central guidance unit, adapted to guide the associated industrial installation, by addressing guidance orders to the local management units of the standard functional modules of the industrial installation, via communication interfaces connected to the central guidance unit by a communication network.

2. Outfit according to claim 1, characterized in that the local management unit of each standard functional module is adapted to address to the central guidance unit of the installation, information messages representative of the state of operation of the functional module, or the state of the fluid on which the functional module acts.

3. Outfit according to claim 1, characterized in that the central guidance unit of each installation comprises means for recording the needs of the user equipment connected at the output of the installation, via a data transfer network.

4. Outfit according to claim 1, characterized in that it comprises an assembly of standard supply modules adapted to ensure the supply of energy to a portion of the functional modules of each installation under the control of the guidance unit of the installation.

5. Outfit according to claim 1, characterized in that it comprises an assembly of standard control modules adapted to record information on the fluid circulating in an installation and to transmit this information to the central guidance unit of said installation.

6. Outfit according to claim 1, characterized in that it comprises an assembly of standard modules for the generation of electrical energy adapted to ensure the production of electricity from energy supplied by other standard modules of the installation.

7. Process for the construction of several complex industrial installations for the treatment of industrial fluids to be delivered to users, comprising the steps of:

A) producing assemblies of several functional modules, the functional modules being adapted each to perform an elementary physical operation of at least one industrial fluid, in which:

each functional module comprises at least one fluid inlet and at least one fluid outlet for the passage of the industrial fluid, as well as a local management unit controlling the operation of the functional module for practicing the associated elementary operation, the local management unit comprising a communication interface, and all the functional modules of a same assembly are adapted to carry out the same elementary operation on the industrial fluid, and are of standard construction, such that the specifications of the inlets, the outlets and the communication interfaces of all the functional modules of a same assembly are analogous;

B) producing for each industrial installation, a central guidance unit, adapted to guide the associated industrial installation, by addressing guidance orders to the local management units of each standard functional module of the installation, via communication interfaces (E/S) connected to the central guidance unit by a communication network;

C) functionally associating, in each industrial unit, the functional modules to each other by their inputs and outputs, so as to ensure successive elementary operations on the fluid of each complex industrial installation; and D) installing in each industrial installation a central guidance unit connected to the communication interfaces of all the standard functional modules of the installation, by a communication network.

8. Outfit according to claim 1, further comprising at least one functional module for elevating the pressure of said industrial fluid.

9. Outfit according to claim 1, wherein said industrial fluid is at least one component of air.

10. An outfit for the construction of plural industrial installations for the processing of industrial fluids to have predetermined characteristics, the processed fluids for delivery to processed fluid users, comprising:

a plurality of functional modules for processing industrial fluids to predetermined characteristics; and a central guidance unit, the plural functional modules arranged according to operational functions in plural assemblies of plural same-operational function modules, each same-operational function processing the industrial fluid to transform at least one of a composition, a temperature, and a pressure characteristic of the industrial fluid, each functional module comprising at least one fluid inlet, at least one fluid outlet, a local management unit to control the operation of the functional module in performing the associated operational function processing the industrial fluid, and a communication interface connectable to a communications network, the plural assemblies being operated by control orders sent from the central guidance unit, via the communications network, to the local management units, the functioning of each functional module locally managed by the local management unit as a function of the control orders received from the central guidance unit, and each of the functional modules of an assembly having the same specifications for the fluid inlets, the fluid outlets, and the communication interface.

11. The outfit of claim 10, wherein the central guidance unit is a personal computer.

12. The outfit of claim 10, wherein one of the assemblies comprises:

a drying module comprising two adsorption cylinders mounted in parallel in parallel branches, the adsorption cylinders having outputs; and consuming equipment connected to the outputs, the outputs directly supplying the consuming equipment with dry air.

13. The outfit of claim 12, further comprising:

an one of the parallel branch, a series arrangement of an air treatment module and a permeation module, the air treatment module comprising filters, the permeation module comprising at lest one membranes selectively permeable by nitrogen and oxygen.

14. The outfit of claim 12, further comprising:

assemblies supplying low-pressure nitrogen and high-pressure nitrogen, at least one assembly comprising a drying decarbonating module having two adsorption cylinders mounted in parallel.

15. The outfit of claim 14, wherein, a distillation module comprising a distillation column provides the low-pressure nitrogen, and a supercharging module comprising a supercharger provides the high-pressure nitrogen.

16. The outfit of claim 10, wherein the communications network is one of ETHERNET, FIP, PROFIBUS and MODBUS.

17. The outfit of claim 10, wherein the control orders from the central guidance unit comprise characteristic values to be achieved at the output of the functional modules.

18. The outfit of claim 17, wherein the values to be achieved are at least one of a flow rate of air for a compression module, a degree of moisture for a drying module, and a minimum composition of a given constituent for a permeation or distillation module.

19. The outfit of claim 17, wherein, information messages are sent from functional module toward the central guidance unit, the information messages comprising data relative to a condition of the fluid on which the functional module operates and data relating to a condition of the functional module.

20. The outfit of claim 19, wherein, the data relative to the condition of the fluid include the temperature, the pressure or the composition of the fluid, and the volume or the mass of the fluid treated, the data relative to the condition of the functional module include the actual condition of operation of the module and to future capabilities to perform, the outfit, when assembled and operated, produces, from atmospheric air, an industrial supply of dry air, low pressure nitrogen and high pressure nitrogen.

* * * * *